(12) United States Patent
Yano et al.

(10) Patent No.: US 6,317,287 B1
(45) Date of Patent: *Nov. 13, 2001

(54) MOTOR WITH OUTPUT SHAFT HAVING LEAD SCREW PORTION AND PRE-LOAD GENERATING MECHANISM

(75) Inventors: Tetsushi Yano; Ryuta Yamawaki; Toshio Sadamitsu; Yukinori Arai, all of Itabashiku (JP)

(73) Assignee: Copal Company Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/629,414

(22) Filed: Apr. 8, 1996

(30) Foreign Application Priority Data

Apr. 7, 1995 (JP) ................................................ 7-082794
May 12, 1995 (JP) ................................................ 7-114679

(51) Int. Cl.[7] ............................. G11B 21/08; H02K 7/06; H02K 37/24
(52) U.S. Cl. ............................ 360/106; 310/12; 74/89.15
(58) Field of Search ................................. 360/106, 109, 360/78.02; 74/89.14, 89.15; 310/49 R, 90, 67 R, 12, 13, 14, 15

(56) References Cited

U.S. PATENT DOCUMENTS

| 4,138,822 | 2/1979 | Parodi ........................ 33/572 |
| 4,457,196 | 7/1984 | Cady ......................... 83/140 |
| 4,586,392 | 5/1986 | Nilsson ..................... 74/89.15 |
| 4,700,251 | 10/1987 | Fuke et al. ............... 360/106 |
| 4,751,411 | 6/1988 | Fukaya et al. ............ 310/49 R |
| 4,782,255 | 11/1988 | Oosaka et al. ............ 310/68 R |
| 4,908,922 | 3/1990 | Abe ....................... 29/898.062 |
| 5,140,479 | 8/1992 | Elsing et al. ............. 360/97.01 |
| 5,351,935 | 10/1994 | Miyoshi et al. . |
| 5,430,590 | 7/1995 | Ainslie et al. ............ 360/98.07 |
| 5,485,331 | 1/1996 | Dunfield et al. .......... 360/99.08 |
| 5,537,275 | 7/1996 | Peace et al. . |

FOREIGN PATENT DOCUMENTS

| 50-87356 | 12/1973 | (JP) . |
| 51-147839 | 2/1975 | (JP) . |
| 60-2367 | 1/1985 | (JP) . |
| 61-156058 | 9/1986 | (JP) . |
| 63-126613 | 2/1987 | (JP) . |
| 63-77471 | 5/1988 | (JP) . |
| 2-2779 | 1/1990 | (JP) . |
| 2-7779 | 1/1990 | (JP) . |
| 2-37583 | 3/1990 | (JP) . |
| 4-131165 | 12/1992 | (JP) . |
| 6-21383 | 3/1994 | (JP) . |
| 6-105525 | 4/1994 | (JP) . |
| 6-133490 | 5/1994 | (JP) . |
| 6-70463 | 9/1994 | (JP) . |

*Primary Examiner*—Brian E. Miller
(74) *Attorney, Agent, or Firm*—Merchant and Gould P.C.

(57) ABSTRACT

A motor with a lead screw is provided with a pre-load generating member for canceling backlash in the axial direction, and the lead screw formed with a feed screw groove portion serves as the output shaft of the motor. The pre-load generating mechanism is constituted by a blind hole, a biasing member, and a movable member. The blind hole is formed concentrically in one end of the lead screw. The biasing member is inserted in the blind hole and has a stroke sufficient to generate a biasing force. The movable member is inserted in the blind hole next to the biasing member to receive the biasing force, and is held to be movable in the axial direction in the blind hole. Hence, the motor with a lead screw can be made short in the axial direction. The biasing member is set to have a sufficiently long stroke so that the stability of the pre-load generating member is maintained high, thereby eliminating backlash in the axial direction.

11 Claims, 11 Drawing Sheets

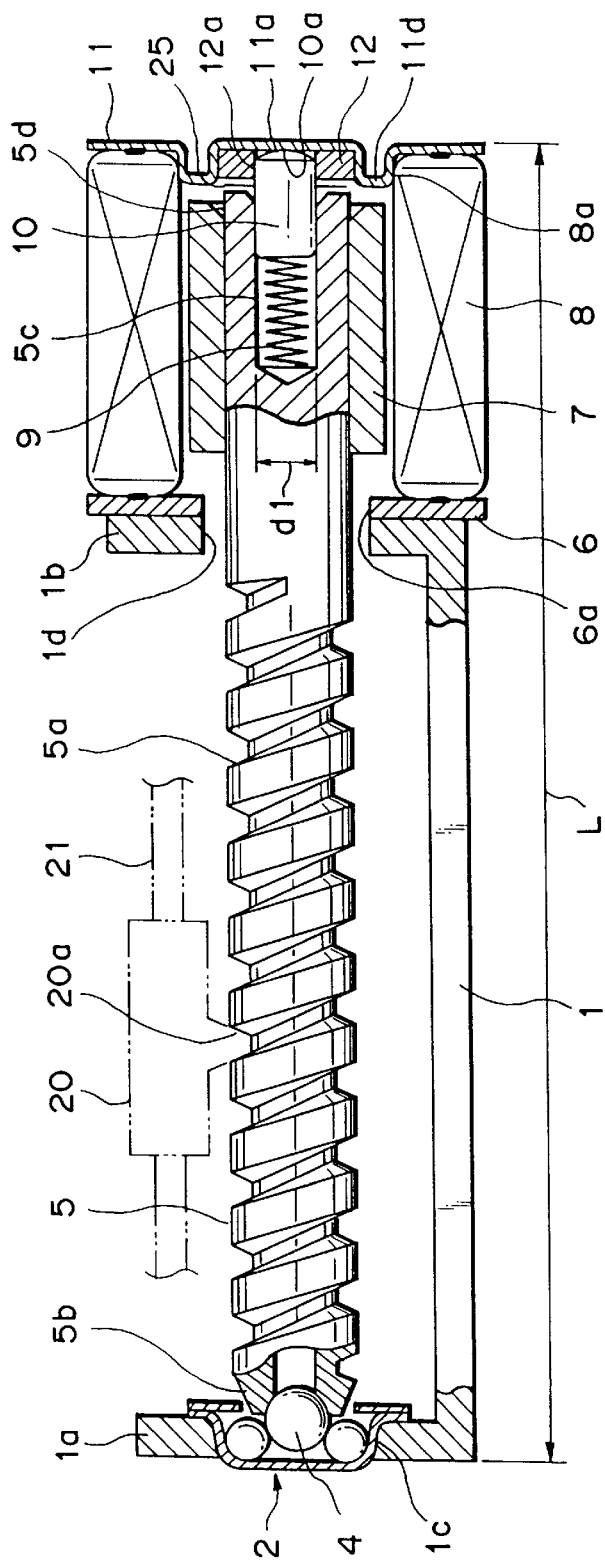
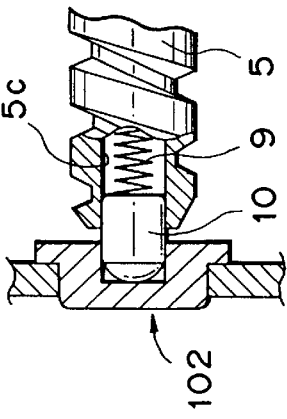
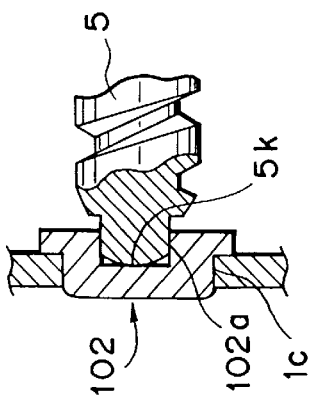
FIG. 4A
FIG. 4B
FIG. 4C

MOTOR WITH OUTPUT SHAFT HAVING LEAD SCREW PORTION AND PRE-LOAD GENERATING MECHANISM

BACKGROUND OF THE INVENTION

The present invention relates to a motor with a lead screw and, more particularly, to a motor with a lead screw which can be short in the axial direction when it is employed to drive, e.g., a recording or reproducing head to track a disk-shaped recording medium and which has good durability.

Conventionally, in one magnetic disk apparatus, among various magnetic disk apparatuses and the like, a lead screw serving as a feed screw is formed on the output shaft of a stepping motor, a desired head is mounted on a carriage which engages with the lead screw, and the stepping motor is driven in a predetermined manner based on a command signal, thereby causing the head to access a desired track of a disk. In this apparatus, when there is conversion of a rotational motion into a rectilinear motion, it is indispensable that the amount of rotation of the stepping motor be accurately converted into a translation of the carriage without error by eliminating any backlash of the lead screw in the axial direction.

In a normal operation state in which an excessive load is not applied, a pre-load mechanism which prevents the lead screw from moving in the axial direction is conventionally provided. More specifically, in an often employed arrangement, one end of the rotating shaft of the motor is fixed in position and axially pivotally supported by a pivot bearing, and the other end of the rotating shaft of the motor is biased in the axial direction by a leaf spring having a spring arm of a predetermined length supported in a substantially cantilevered manner.

The pre-load mechanism of this arrangement employing the leaf spring is advantageous in that its structure can be simplified. However, in order to obtain a desired biasing force, the spring arm of the leaf spring is caused to flex in the longitudinal direction of the lead screw in a cantilevered manner. Hence, the variations in the entire length of the lead screw in the axial direction adversely influence the biasing force of the pre-load mechanism. As a result, a sufficient pre-load precision cannot be guaranteed.

A spring arm may come into contact with the shaft end of the lead screw in a tilted state depending on the variations in entire length of the lead screw in the axial direction. When the spring arm contacts the shaft end in a tilted state in this manner, for example, a biasing force undesirable for the pre-load mechanism is generated, e.g., a component of force is generated in the radial direction, leading to non-uniform wear of the pre-load mechanism. In particular, when the leaf spring is made small, a sufficiently long spring arm cannot be obtained, making it further difficult to prevent the spring arm from coming into contact with the shaft end in a tilted state, as described above.

For this reason, Japanese Patent Laid-Open No. 6-133490 proposes a motor with a lead screw, which has a biasing member, in place of a leaf spring, that can translate as it is formed with a plurality of spiral slits.

The arrangement of this prior art will be briefly described with reference to the accompanying drawings. FIG. 10A is a sectional view of the main part of the arrangement of this prior art. FIG. 10B is a front view of the biasing member. Referring to FIG. 10A, a lead screw 105 is pivotally supported by a bearing 103 of a base 101. One end portion of the lead screw 105 is axially supported by a pivot bearing (not shown). The end portion of the lead screw 105 shown in FIG. 10A is biased by a biasing force which is generated upon deformation of a biasing member 111, so that the lead screw 105 is moved in the axial direction, thereby eliminating any backlash in the axial direction. A permanent magnet 107 made of a predetermined magnetic material and rotatable within a coil 108 fixed to the base 101 through a mount plate 106 is fixed to the lead screw 105. A rotating magnetic field is generated by the permanent magnet 107 and the coil 108, thereby rotating the lead screw 105 for a predetermined amount.

A plurality of spiral slits 111b are formed in the biasing member 111, as shown in FIG. 10B, to enable an acting portion 111a of the biasing member 111 to translate, so that a biasing force acts on the end portion of the lead screw 105. Also, as shown in FIG. 10A, a lid member 112 is provided to prevent the biasing member 111 from deforming more than its maximum deformation amount.

With the above arrangement, since the spring arm of the leaf spring can be prevented from coming into contact with the shaft end of the lead screw in a tilted state, a component of force is not generated in the radial direction. Since generation of an undesirable biasing force is eliminated, non-uniform wear and the like can be prevented.

A motor with a lead screw according to the conventional arrangement, which is widely put into practical use and which has a pre-load mechanism employing a leaf spring, will be described with reference to the schematic diagram of FIG. 11. Referring to FIG. 11, a lead screw 105 is pivotally supported by a bearing 12 of a base 101, and its end portion is axially supported by a pivot bearing 202. A leaf spring 109 deforms with respect to the right end portion of the lead screw 105, thereby eliminating any backlash of the lead screw 105 in the axial direction. The leaf spring 109 is fixed to a lid member fixed to the end portion of a coil 108 serving as a stator. A permanent magnet 107 made of a predetermined magnetic material and rotatable within the coil 108 fixed to the base 101 is fixed to the lead screw 105. When a rotating magnetic field is generated by the permanent magnet 107 and the coil 108, the lead screw 105 is rotated for a predetermined amount. A biasing mechanism which has the above arrangement and which performs biasing in the axial direction with deformation of the leaf spring 109 is widely put into practical use as it can be fabricated easily. However, in order to obtain a desired biasing force, the leaf spring is caused to flex in the longitudinal direction of the lead screw in a cantilevered manner, as shown in FIG. 11. Hence, variations in the entire length of the lead screw in the axial direction adversely, directly influence the biasing force of the pre-load mechanism. As a result, a sufficient pre-load precision cannot be guaranteed.

The leaf spring 109 may come into contact with the shaft end of the lead screw in a tilted state depending on the variations in the entire length of the lead screw in the axial direction. When the leaf spring 109 contacts the shaft end in a tilted state in this manner, a biasing force F, undesirable for the pre-load mechanism, is generated, e.g., a component of force in the radial direction is generated, leading to non-uniform wear of the pre-load mechanism. In particular, when the leaf spring is made small, a sufficiently long spring arm cannot be obtained, making it more difficult to prevent the spring arm from coming into contact with the shaft end in a tilted state, as described above.

For this reason, a motor with a lead screw as proposed, as in Japanese Utility Model Laid-Open No. 6-21383, has a complicated pre-load mechanism that applies a pre-load to a pivot bearing with a leaf spring. Also, in an arrangement shown in, e.g., Japanese Utility Model Laid-Open Nos. 60-2367 and 63-77471, the two ends of a lead screw 105 are axially supported by pivot bearings so that the lead screw 105 can rotate without wobbling. Japanese Patent Laid-Open No. 6-105525 discloses an arrangement in which the shaft end of a lead screw is axially supported by a bearing constituted by a metal bearing and a leaf spring. In any of these arrangements, however, the size of the motor is undesirably increased in the axial direction.

According to the arrangement disclosed in Japanese Patent Laid-Open No. 6-133490 described above, a pressing portion having spiral slits is provided in order to apply a pre-load to the end portion of the lead screw with a biasing member which can translate. Since at least the spring arm of the leaf spring can be prevented from coming into contact with the shaft end of the lead screw in a tilted state, a component of force is not generated in the radial direction. Since generation of an undesirable biasing force is eliminated, non-uniform wear and the like can be prevented. However, as the lead screw is increased in length in the axial direction, the motor cannot be made small.

SUMMARY OF THE INVENTION

In the arrangement shown in FIG. 10A, in order to absorb the variations in the length of the lead screw in the axial direction, the acting portion 111a must be able to translate with a sufficiently large stroke by forming long spiral slits 111b of the biasing member 111. In other words, high stability of the pre-load mechanism can be achieved by setting the biasing member to have a large deformation amount.

According to the proposal shown in FIG. 10A, in order to prevent the biasing member 111 from excessively deforming and exceeding its elastic limit upon reception of a strong impact when it is, e.g., dropped while it is being conveyed or in use, the lid member 112 must project in the axial direction. Thus, the motor cannot but be made long in the axial direction.

Referring to FIG. 11 again, the motor with a lead screw which has a pre-load mechanism employing the conventional leaf spring 109 can be made comparatively short in the axial direction. According to this arrangement, however, since the leaf spring is cantilevered, the amount of deformation is small and it is unstable. In addition, when the end portion of the lead screw is pressed, a component of force is generated in the radial direction depending on the state of deformation of the leaf spring.

As a result, the shaft core is not accurately located at the central portion of the coil 108, thereby causing a load during rotation. As a result, a detent torque of the rotational load is generated particularly when power is not supplied.

As shown in FIG. 11, regarding the inner-diameter portion of the bearing 12 that directly supports an intermediate portion of the lead screw 105, as it axially supports the lead screw as shown in FIG. 11, the inner diameter of the bearing 12 cannot be decreased simply. For this reason, the slidable area between the outer circumferential surface of the lead screw 105 and the inner-diameter portion of the bearing 12 increases. Consequently, the load during rotation cannot be decreased, not only further increasing the detent torque described above but also decreasing the response speed.

For example, when the leaf spring 109 deforms as described above and a deviation H is generated in the rotation center of the lead screw 105, a load F is generated in the radial direction in the permanent magnet 107 serving as the rotor. More specifically, the radial load F obtained by (L1+L2)F/L1 is generated where L1 is the distance between the left end of the lead screw 105 and the bearing 12 and L2 is the distance between the bearing 12 and the central portion of the permanent magnet 107. This adversely influences the durability of the bearing 12.

The present invention has been made in view of the above inconveniences, and has as its object to provide a motor with a lead screw in which a sufficient stability of the pre-load mechanism can be maintained by setting a large amount of deformation for the biasing member of the pre-load mechanism employed to eliminate any backlash of the lead screw in the axial direction and which can be made as short as possible in the axial direction.

In addition to the above object, it is another object of the present invention to provide a motor with a lead screw that can maintain the initial operating state over a long period of time.

It is still another object of the present invention to provide a motor with a lead screw in which even when the motor is made as short as possible in the axial direction of the lead screw, a sufficient stability of the pre-load mechanism can be maintained by setting a large amount of deformation for the biasing member of the pre-load mechanism employed to eliminate any backlash of the lead screw in the axial direction, a high response speed is maintained by decreasing the detent torque, and an external force in the radial direction which is an excessive external force is prevented from acting on the bearing of the lead screw, thereby extending the service life.

In order to solve the above problems and to achieve the above objects, according to the present invention, there is provided a motor with a lead screw, which is provided with a pre-load generating means for canceling backlash in an axial direction and in which the lead screw formed with a feed screw groove portion serves as an output shaft of the motor, wherein the pre-load generating means comprises a blind hole formed concentrically in one end of the lead screw, a biasing member inserted in the blind hole and having a stroke sufficient to generate a biasing force, and a movable member inserted in the blind hole next to the biasing member to receive the biasing force and held to be movable in the axial direction in the blind hole.

According to the present invention, there is also provided a motor with a lead screw, which is provided with a pre-load generating means for canceling backlash in an axial direction and in which the lead screw formed with a feed screw groove portion is integrally formed with an output shaft of the motor, wherein the other end and an intermediate portion of the lead screw are pivotally, axially supported by a base portion, one side surface portion of a coil constituting the motor is fixed to the base portion, a permanent magnet located in the coil is fixed to the lead screw, and the pre-load generating means comprises a blind hole formed concentrically in one end of the lead screw, a biasing member inserted in the blind hole and having a stroke sufficient to generate a biasing force, a movable member, which is inserted in the blind hole next to the biasing member to receive the biasing force of the biasing member, which is held to be movable in the axial direction in the blind hole, and which forms a spherical end face partly projecting from the one end of the lead screw, and a substantially flat lid member fixed to the other end surface portion of the coil so as to abut against the spherical end face.

According to the present invention, there is also provided a motor with a lead screw, which is provided with a pre-load generating means for canceling backlash in an axial direction and in which the lead screw formed with a feed screw groove portion is integrally formed with an output shaft of the motor, wherein the other end of the lead screw is pivotally, axially supported by a pivot bearing provided to a base portion and an intermediate portion of the lead screw is pivotally, axially supported by a bearing provided to the base portion, one end surface portion of an annular coil constituting the motor for generating a rotating magnetic field is fixed to the base portion, a permanent magnet located in the coil and magnetized to have multiple poles is fixed to the lead screw, and the pre-load generating means comprises a blind hole formed concentrically in one end of the lead screw, a coil spring inserted in the blind hole and having a stroke sufficient to generate a biasing force, a rod-shaped member which is inserted in the blind hole next to the coil spring to be held to be movable in the axial direction in the blind hole and which forms a spherical end face partly projecting from the one end of the lead screw, and a substantially flat lid member fixed to the other end surface portion of the annular coil so as to abut against the spherical end face.

According to the present invention, there is also provided a motor with a lead screw, which is provided with a pre-load generating means for canceling backlash in an axial direction and in which the lead screw formed with a feed screw groove portion is integrally formed with an output shaft of the motor and two ends of the lead screw are pivotally, axially supported, wherein the pre-load generating means comprises a blind hole formed concentrically in one end of the lead screw, a biasing member inserted in the blind hole and having a stroke sufficient to generate a biasing force, a rod-shaped member, which is inserted in the blind hole next to the biasing member to receive the biasing force, which is held to be movable in the axial direction in the blind hole, and which forms a spherical end face partly projecting from the one end of the lead screw, and a lid member which abuts against the end face and is fixed to an end surface portion of the coil constituting the motor in order to fix a bearing of the rod-shaped member.

According to the present invention, there is also provided a motor with a lead screw, which is provided with a pre-load generating means for canceling backlash in an axial direction and in which the lead screw formed with a feed screw groove portion is integrally formed with an output shaft of the motor and two ends of the lead screw are pivotally, axially supported, wherein one end of the lead screw is pivotally, axially supported by a pivot bearing provided to a base portion, one end surface portion of a coil constituting the motor is fixed to the base portion, a permanent magnet located in the coil and magnetized to have multiple poles is fixed to the lead screw, and the pre-load generating means comprises a blind hole formed concentrically in one end of the lead screw, a coil spring inserted in the blind hole and having a stroke sufficient to generate a biasing force, a rod-shaped member which is inserted in the blind hole next to the coil spring to be held to be movable in the axial direction in the blind hole and which forms a spherical end face partly projecting from the one end of the lead screw, and a lid member which abuts against the spherical end face and is fixed to the other end surface portion of the coil in order to fix a bearing of the rod-shaped member.

According to the present invention, there is also provided a motor with a lead screw, which is provided with a pre-load generating means for canceling backlash in an axial direction and in which the lead screw formed with a feed screw groove portion is integrally formed with an output shaft of the motor and two ends of the lead screw are pivotally, axially supported, wherein the pre-load generating means is constituted by a blind hole formed concentrically in one end of the lead screw, a biasing member inserted in the blind hole and having a stroke sufficient to generate a biasing force, a rod-shaped member, which is inserted in the blind hole next to the biasing member to receive the biasing force, which is held to be movable in the axial direction in the blind hole, and which forms a spheroidal or spherical end face, and a lid member which abuts against the spheroidal or spherical end face and serves to fix a projecting member that supports the blind hole, the lid member being fixed to one end surface portion of the coil constituting the motor.

In the above arrangement, in order to provide the output shaft with a lead screw which has one end pivotally supported while it is fixed in position in the axial direction and the other end pivotally supported while it is biased in the axial direction and which is formed with a feed screw groove portion, a blind hole is formed concentrically in the output shaft. A biasing member is inserted in the blind hole. A rod-shaped member forming a spherical surface on its surface is inserted next to the biasing member to project for a predetermined amount. Then, a substantially flat lid member that abuts against the spherical surface is fixed to the base portion. As a result, the motor can be made short in the axial direction. The biasing member is set to have a sufficiently long stroke so that a prescribed stability of the pre-load generating means is maintained, thereby eliminating any backlash in the axial direction. Simultaneously, the detent torque is decreased to maintain a high response speed, and a long service life is assured by preventing an excessive force from acting on the bearing.

It is a matter of course that the present invention is not limited to the embodiments to be described below but various arrangements can be made. Various such arrangements can be realized within the scope defined by the claims and embodiments and drawings to be described below.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4A is an overall sectional view showing the main part of a motor with a lead screw according to the second embodiment, and FIGS. 4B and 4C are main part sectional views showing the bearing portion of the motor with a lead screw;

DETAILED DESCRIPTION OF THE PREFERRED EMBODIMENTS

Figure 1:
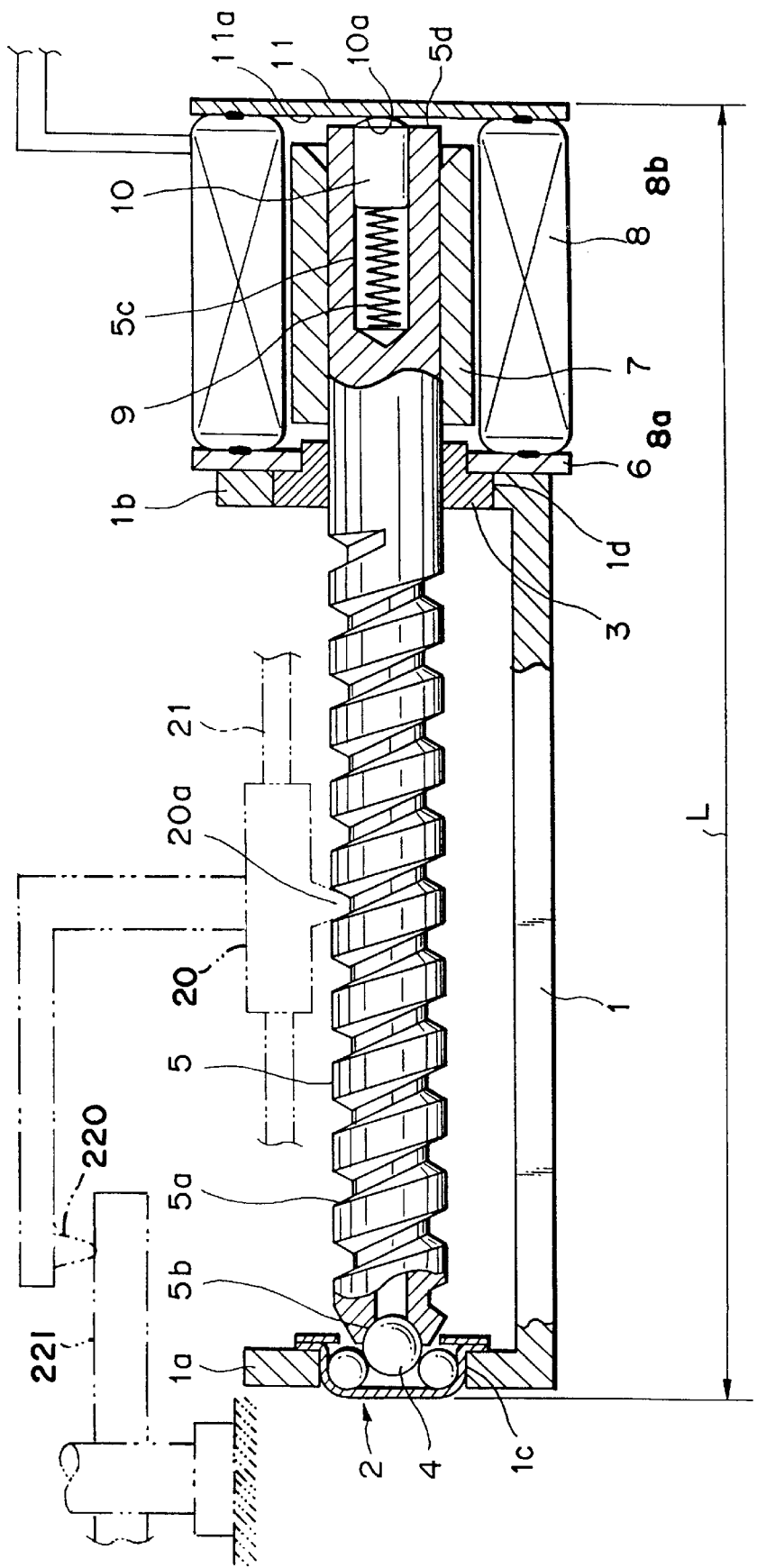
FIG. 1 is an overall sectional view showing the main part of a motor with a lead screw according to the first embodiment of the present invention.

The preferred embodiments of the present invention will be described with reference to the accompanying drawings. FIG. 1 is a partially cutaway sectional view showing the main part of a motor with a lead screw according to the first embodiment. Referring to FIG. 1, the motor with a lead screw moves a carriage 20 indicated by a broken line in FIG. 1 along a shaft body 21. Thus, this motor is used as a tracking drive motor that drives a recording or reproducing head 220 mounted on the carriage 20 to a predetermined track of a magneto-optical disk or the like serving as a disk-shaped predetermined recording medium 221. The present invention is not limited to this, but can be particularly applied to various types of instruments having a rotation-rectilinear movement converting mechanism and made short in the axial direction of the lead screw.

In order to constitute such a rotation-rectilinear movement converting mechanism, the carriage 20 is formed with an engaging portion 20a which engages with a feed screw groove portion 5a, formed on the outer circumferential surface of a lead screw 5, without backlash. The shaft body 21 is disposed to be parallel to the lead screw 5 integrally formed with the output shaft of the motor. A recording or reproducing head (not shown) is mounted on the carriage 20.

A base 1 is integrally formed with a left wall portion 1a and a right wall portion 1b into a substantially U-letter shape, as shown in FIG. 1. A first through hole portion 1c and a second through hole portion 1d are respectively formed in the left wall portion 1a and right wall portion 1b to be coaxial with them. A pivot bearing 2 is press fitted into the first through hole portion 1c to be held by it. The pivot bearing 2 is in point contact with a ball 4 pivotally incorporated in a ball guide portion 5b formed from the left end portion of the lead screw 5, so that the ball 4 is rotatable with almost no load being applied to it. A bearing 3 made of a sintered body or the like is provided in the second through hole portion 1d of the base 1 to fit in the hole portion in a mount metal member 6, thereby rotatably supporting the motor-side portion of the lead screw 5.

A permanent magnet 7 made of a predetermined magnetic material (including a resin magnet or a plastic magnet) is fixed to the lead screw 5. The permanent magnet 7 is rotatably provided in a coil 8 fixed to the base 1 through the mount metal member 6. When a rotating magnetic field is generated by the coil 8 and the permanent magnet 7, the lead screw 5 rotates through a predetermined angle, thereby moving the carriage 20 in an arbitrary direction.

In this embodiment, the lead screw 5 having the feed screw groove portion 5a formed on its outer circumferential surface is integrally provided to the output shaft of the motor. However, a motor shaft may be prepared as a separate component, and may be bonded to an intermediate portion of the lead screw, thereby forming an integral component of the lead screw and the motor shaft.

A blind hole 5c is formed in a right end portion 5d of the lead screw 5 to be concentric with the lead screw 5 and to have a depth equal to or more than half the entire length of the permanent magnet 7. A compression coil spring 9 having a free length of about 1.5 to twice the length of the compressed form, a predetermined wire diameter, a predetermined number of turns, and a predetermined outer size is incorporated in the blind hole 5c. Next to the compression coil spring 9, a rod-shaped member 10 is inserted in the blind hole 5c to project from the right end portion 5d of the lead screw 5 for a predetermined amount and to be movable in the axial direction, which is the longitudinal direction of the lead screw 5.

The surface of the rod-shaped member 10 forms a spherical surface 10a having a predetermined radius, as shown in FIG. 1. An abutting surface 11a of a substantially flat lid member 11 fixed to the end surface portion of the bobbin of the coil 8 by spot welding or the like abuts against the spherical surface 10a. For this purpose, a grease-type lubricant is applied to the abutting surface 11a of the lid member 11 in advance before the motor with a lead screw is completed into the state shown in FIG. 1.

When the motor with a lead screw is completed in the above manner, its entire length L in the axial direction of the lead screw 5 can be shortened, and a sufficient stroke of the compression coil spring 9 provided in the blind hole 5c having a sufficient depth can be maintained, thereby assuring a high stability of the pre-load mechanism.

Figure 2A:
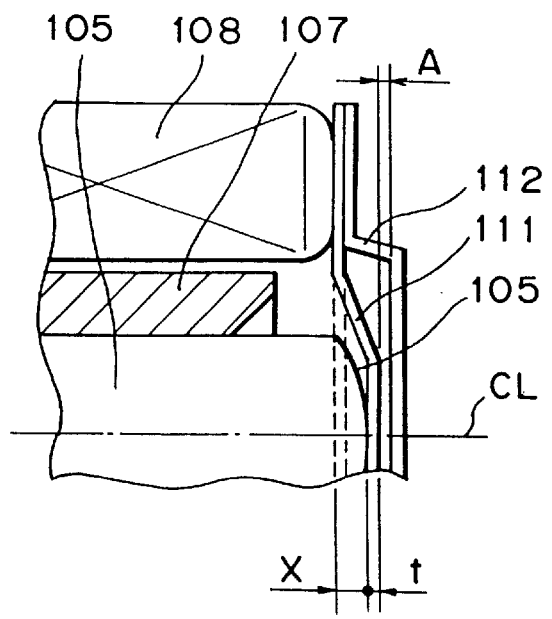
FIG. 2A is a main part sectional view showing a conventional motor with a lead screw for the purpose of comparison.
Figure 2B:
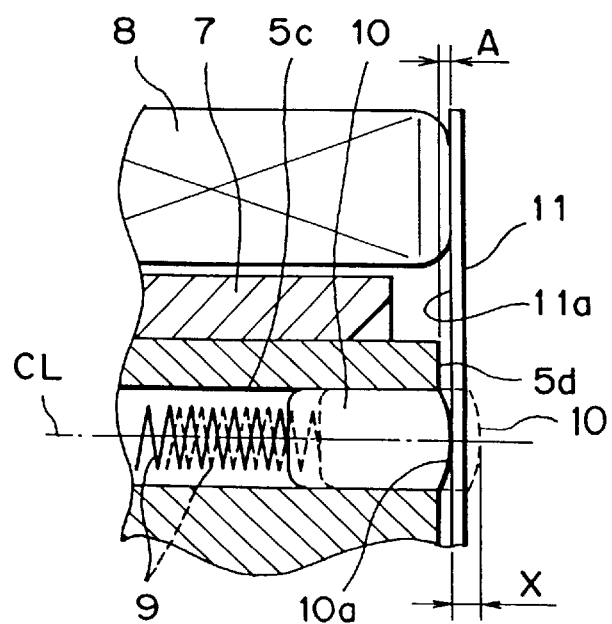
FIG. 2B is a main part sectional view of the motor with a lead screw according to the first embodiment shown in FIG. 1.

FIGS. 2A and 2B show the comparison between the motor with a lead screw having the arrangement shown in FIG. 1 and the motor with a lead screw described in Japanese Patent laid-open No. 6-133490. In FIGS. 2A and 2B, the coils 8 and 108, and the permanent magnets 7 and 107 have the same shape and size for the purpose of comparison.

In the embodiment of FIG. 2B, the lid member 11 is a flat plate fixed to the end surface of the coil 8 and its plate thickness is thus large in the axial direction. A sufficient deformation stroke X for pre-load biasing the compression coil spring 9 can be obtained. A sufficient distance A can also be obtained between the right end portion 5d and the abutting surface 11a of the lid member 11.

In contrast to this, in the conventional motor with a lead screw, as shown in FIG. 2A, a stroke X for translation of the acting portion of the biasing member 111 is maintained first. Regarding the lid member 112, its size with reference to the end surface of the coil 108 is added with a plate thickness t and a distance A between the biasing member 111 and the inner surface of the lid member 112, which aims at avoiding interference caused by variations in entire length of the component. Thus, the length of this motor is increased in the axial direction.

From the above description, according to the arrangement of this embodiment, a sufficient deformation stroke X for pre-load biasing the compression coil spring 9 serving as the biasing member can be obtained, and the length of the motor can be made sufficiently short in the axial direction. Also, in place of the leaf spring, and since the compressive force of the compression coil spring 9 can be managed easily as compared to that for the leaf spring, this arrangement is particularly suitable for a motor with a lead screw having an outer diameter of, e.g., 10 mm or less.

Figure 3A:
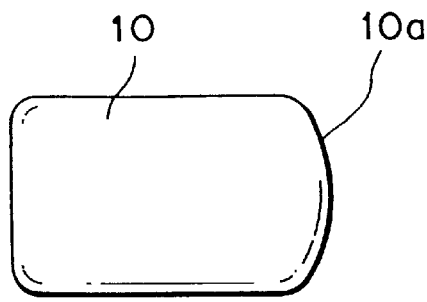
FIGS. 3A to 3C are front views of rod-shaped members 10.
Figure 3D:
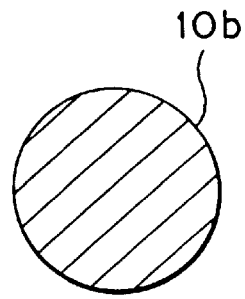
FIGS. 3D to 3F are cross sectional views of the rod-shaped members 10.
Figure 3B:
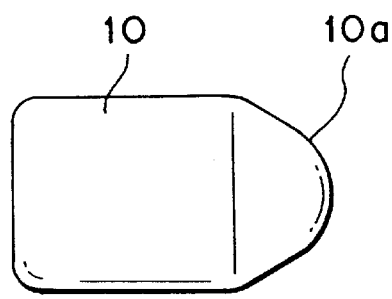
Figure 3E:
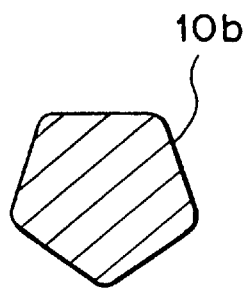
Figure 3C:
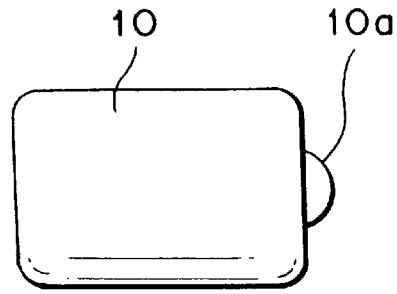
Figure 3F:
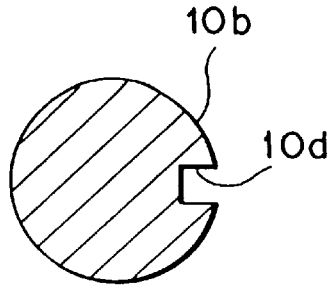

FIGS. 3A to 3C show the anti-rotation structures of the rod-shaped member 10, and FIGS. 3D to 3F show cross sections of the rod-shaped member 10. According to the first embodiment of the present invention, the rod-shaped member 10 inserted in the blind hole 5c formed in the right end portion 5d of the lead screw 5 is movable in the direction of depth of the blind hole 5c. However, considering a case wherein, e.g., the biasing force of the compression coil spring 9 is large or foreign matter enters the blind hole 5c, it is better that the rod-shaped member 10 does not rotate at all in the blind hole 5c.

Therefore, the rod-shaped members 10 are prepared to be constituted by combinations of a spherical surface, a conical portion, and a semi-spherical portion having a predetermined radius, that constitute surface portions 10a shown in FIGS. 3A to 3C, respectively, and cross sections of the rod-shaped members 10 shown in FIGS. 3D to 3F. When the rod-shaped members 10 are respectively inserted in the blind holes 5c that form female holes matching outer shapes 10b and 10d shown in FIGS. 3D to 3F, the respective rod-shaped members 10 can always rotate together with the corresponding lead screws 5. As a result, the rod-shaped members 10 can always rotate as they are stably biased.

As described above, according to the present invention, there is provided a motor with a lead screw in which a sufficient stability of the pre-load mechanism can be maintained by setting a large amount of deformation for the biasing member and which can be made as short as possible in the axial direction. Also, a motor with a lead screw that can maintain the initial operating state over a long period of time can be provided.

The present invention is not limited to the first embodiment described above, but various arrangements can be made. For example, the distal end of the shaft may be inserted in a thrust bearing or a simple hole portion, in place of the pivot bearing. Also, the pivot bearing can be provided to the side where the motor is disposed. Furthermore, the motor is not limited to the stepping motor described above but can be a DC motor, and it can be of any type, as a matter of course.

A motor with a lead screw according to the second embodiment will be described with reference to the main part partially cutaway sectional view of FIG. 4A. In FIG. 4A, portions identical to those described above are denoted by the same reference numerals to avoid redundant explanation, and the description will be limited to only portions different from their counterparts described above. A base 1 is integrally formed with a left wall portion 1a and a right wall portion 1b into a substantially U-letter shape, as shown in FIG. 4A. A first through hole portion 1c and an insertion hole portion 1d are respectively formed in the left wall portion 1a and right wall portion 1b to be coaxial with them. A pivot bearing 2 is held in the first through hole portion 1c by, e.g., press fitting. The pivot bearing 2 is in point contact with a ball 4 pivotally incorporated in a ball guide portion 5b formed from the end portion of a lead screw 5, so that the ball 4 is rotatable with almost no load being applied to it.

The insertion hole portion 1d is formed to have an inner diameter with a margin so that the lead screw 5 can be inserted in it, as shown in FIG. 4A. Also, the insertion hole portion 1d is formed to have an inner diameter substantially the same as that of an inner-diameter hole portion 6a of a mount metal member 6. Thus, the insertion hole portion 1d serves as a guide portion when a coil 8 is fixed on the right wall portion 1b of the base 1 through the mount metal member 6.

A blind hole 5c is formed in the right end portion of the lead screw 5 to be concentric with the lead screw 5 and to have a depth equal to or more than half the entire length of a permanent magnet 7 and a predetermined inner diameter d1. A compression coil spring 9 having a free length of about 1.5 to twice of the compressed form, a predetermined wire diameter, a predetermined number of turns, and a predetermined outer size is incorporated in the blind hole 5c. Next to the compression coil spring 9, a rod-shaped member 10 is inserted in the blind hole 5c such that its bottom surface abuts against the compression coil spring 9, so that it projects from a right end portion 5d of the lead screw 5 for a predetermined amount and is movable in the longitudinal direction.

The rod-shaped member 10 has an outer size d2 (shown in FIG. 5A) with which it can move in the blind hole 5c without backlash in the longitudinal direction. One end of the rod-shaped member 10 forms a spherical portion 10a, as shown in FIG. 4A. An abutting surface 11a of a lid member 11 fixed to the end surface portion of the bobbin of the coil 8 by spot welding or the like abuts against the spherical portion 10a, thereby preventing any backlash in the axial direction.

An annular projecting portion 11d having a shape to fit on the inner circumferential surface of the coil 8 is formed on the lid member 11 by, e.g; pressing, as shown in FIG. 4A. The annular projecting portion 11d fixes a bearing 12 in it, thereby axially supporting the rod-shaped member 10. An oil deflector 25 is interposed between the bearing 12 and the right end portion 5d. The oil deflector 25 separates the bearing 12 and the right end portion 5d from each other when the bearing 12 is constituted by, e.g., an oil-impregnated metal bearing and the blind hole 5c is coated with a grease to allow the rod-shaped member 10 to slide on it. The bearing 12 may be made of a self-lubricating polyacetal resin, crystalline polymer, or the like. In this case, the oil deflector 25 can be omitted.

When the motor with a lead screw is completed in the above manner, its entire length L in the axial direction of the lead screw can be decreased, a sufficient stroke of the compression coil spring 9 provided in the blind hole 5c having a sufficient depth can be maintained to assure a high stability of the pre-load mechanism, and the two ends of the lead screw 5 can be axially supported.

In FIG. 4A, a bearing 102 which can be formed less expensively may be provided to the end portion of the lead screw in place of the pivot bearing 2, and the load in the thrust direction may be received with a spherical surface 5k, as shown in FIG. 4B.

As shown in FIG. 4C, the rod-shaped member 10 may be provided in the blind hole 5c formed in the end portion of the lead screw, the pivot bearing 2 may be provided at the other end portion, on the motor side, of the lead screw, and a feed screw groove portion 5a may be formed to have a pitch in the counter-rotating direction.

Figure 5A:
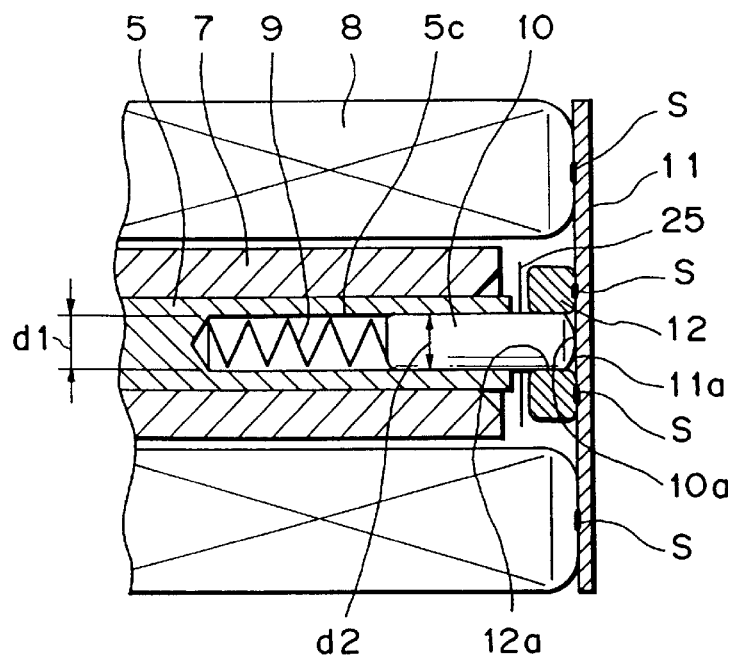
FIG. 5A is a main part sectional view showing a modification of the motor with a lead screw.

FIG. 5A is a main part sectional view showing a modification of the motor with a lead screw. In FIG. 5A, portions identical to those described above are denoted by the same reference numerals to avoid redundant explanation, and the description will be limited to only portions different from their counterparts described above. A bearing 12 is made of a metal, and is spot-welded to a lid member 11, similarly made of a metal plate, at a portion S. The lid member 11 has an outer shape similar to that of the coil 8. After the outer shapes of the lid member 11 and the coil 8 are set the same, they are spot-welded to each other to obtain a complete product shown in FIG. 5A. Thus, the motor with a lead screw can be made at a lower cost.

Figure 5B:
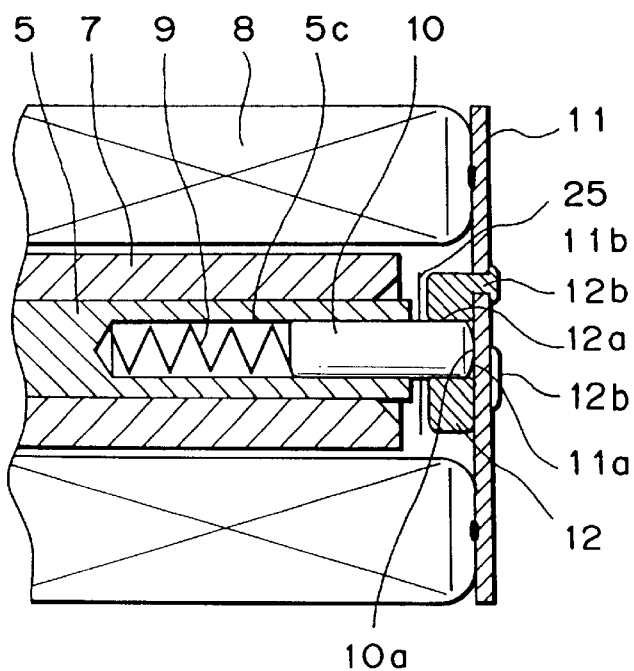
FIG. 5B is a main part sectional view showing another modification of the motor with a lead screw.

FIG. 5B is a main part sectional view showing another modification of the motor with a lead screw. In FIG. 5B, portions identical to those described above are denoted by the same reference numerals to avoid redundant explanation, and the description will be limited to only portions different from their counterparts described above. A bearing 12 is made of a metal, and caulking margins 12b are integrally formed with the bearing 12 at an equal angular interval of 120°. The caulking margins 12b are inserted in caulking holes 11b formed in advance in a lid member 11 made of a metal plate, and the bearing 12 is fixed by caulking. With this arrangement, the motor with a lead screw can be made at a low cost.

Figure 6A:
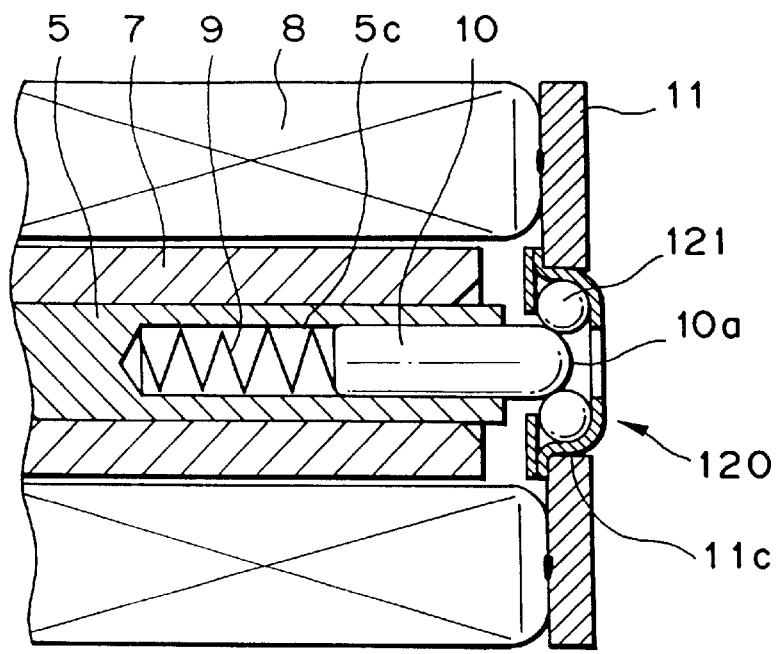
FIG. 6A is a main part sectional view showing a modification of the motor with a lead screw of the second embodiment.

FIG. 6A is a main part sectional view showing still another modification of the motor with a lead screw. In FIG. 6A, portions identical to those described above are denoted by the same reference numerals to avoid redundant explanation, and the description will be limited to only portions different from their counterparts described above. A through hole portion 11c is formed in a lid member 11, and a pivot bearing 120 is press fitted in the through hole portion 11c to be fixed in it. A spherical portion 10a of a rod-shaped member 10 abuts against balls 121 rotatably held in the pivot bearing 120. With this arrangement, although the cost of the motor with a lead screw is increased because of the pivot bearing 120, the rod-shaped body 10 can rotate very lightly while preventing backlash in the axial direction. Also, rotation can be achieved even without a lubricant.

Figure 6B:
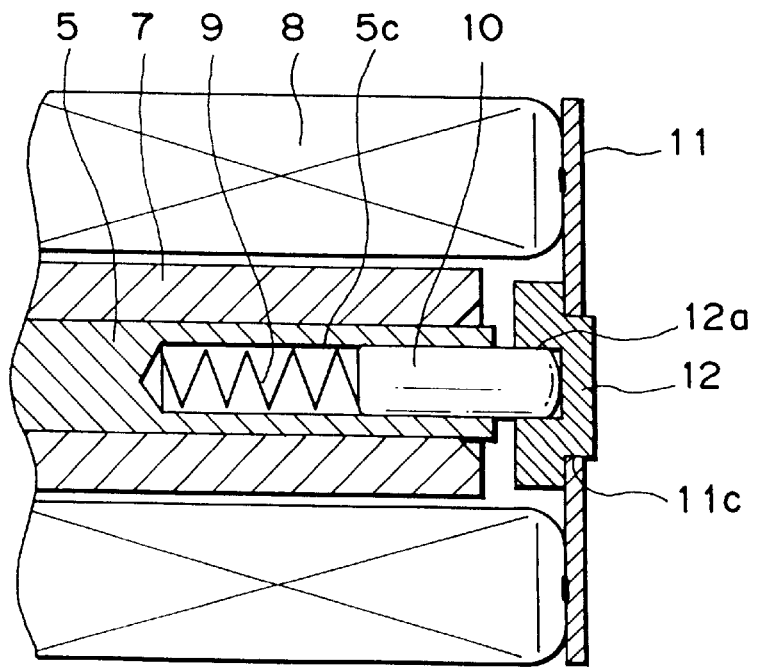
FIG. 6B is a main part sectional view showing another modification of the motor with a lead screw of the second embodiment.

FIG. 6B is a main part sectional view showing still another modification of the motor with a lead screw which can be made with the lowest cost. A through hole portion 11c is formed in a lid member 11. A bearing 12 having self lubricity is press fitted in the through hole portion 11c to be fixed in it. A rod-shaped body 10 is guided in a bearing hole portion 12a of the bearing 12 in the circumferential direction, and it is rotatably guided such that its spherical portion 10a abuts against the bearing hole portion 12a of the bearing 12. Therefore, the rod-shaped body 10 can rotate lightly without lubrication while its backlash in the axial direction is prevented.

In any of the above embodiments, the rod-shaped body 10 partly projecting from the blind hole 5c formed in the right end portion of the lead screw 5 is axially supported by the bearing 12. In the third embodiment to be described below, a ball or a rod-shaped body 30 which is inserted in a blind hole 5c next to a compression coil spring 9 is pressed directly, and a lead screw 5 is axially supported with a male bearing body having a projecting portion that fits in the blind hole 5c.

Figure 7:
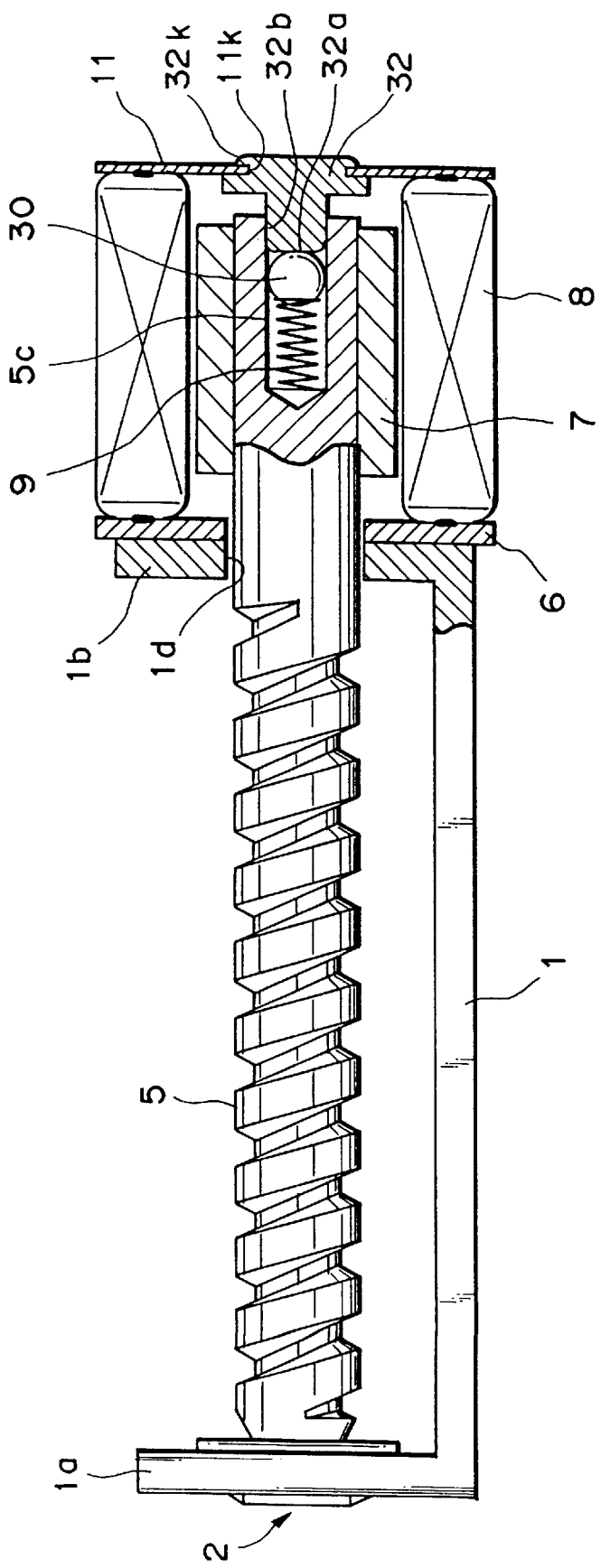
FIG. 7 is an overall sectional view showing the main part of a motor with a lead screw according to the third embodiment.

FIG. 7 is a main part sectional view showing a motor with a lead screw according to the third embodiment. In FIG. 7, portions identical to those described above are denoted by the same reference numerals to avoid redundant explanation, and the description will be limited to only portions different from their counterparts described above. In FIG. 7, a male bearing body 32 is made of a metal and is integrally formed with a caulking margin 32k. The caulking margin 32k is inserted in a caulking hole 11k formed in a lid member 11 made of a metal plate, and the male bearing body 32 is caulked, so that it is fixed as shown in FIG. 7. An abutting surface 32a and an outer circumferential surface 32b are integrally formed with the male bearing body 32 to achieve axial support as shown in FIG. 7. A ball 30 is inserted next to a compression coil spring 9 in a blind hole 5c formed in the right end portion of a lead screw 5. The male bearing body 32 directly presses the rod-shaped body 30 with its abutting surface 32a. With the above arrangement, even if the motor with a lead screw is formed to be as short as possible in the axial direction of the lead screw 5, in the same manner as in the above embodiments, the amount of deformation of the pre-load mechanism constituted by the compression coil spring 9, the ball 30, and the male bearing body 32 can be set large, thereby maintaining a sufficient stability. Since the diameter of axial support can be decreased, the detent torque can be decreased. As a result, a high response speed can be maintained, and an excessive external force is prevented from acting on the bearing in the radial direction, thereby prolonging the service life.

Figure 8A:
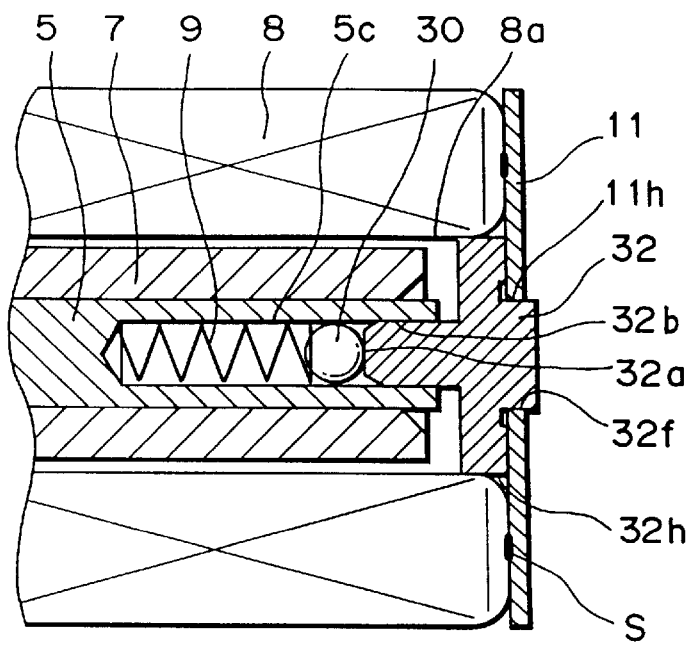
FIG. 8A is a main part sectional view showing a modification of the motor with a lead screw shown in FIG. 7.

FIG. 8A is a main part sectional view showing a modification of the motor with a lead screw having the arrangement shown in FIG. 7. In FIG. 8A, portions identical to those described above are denoted by the same reference numerals to avoid redundant explanation, and the description will be limited to only portions different from their counterparts described above. A male bearing body 32 is made of a self-lubricating resin material. A boss portion 32f of the male bearing body 32 is inserted in a hole portion 11h formed in a lid member 11 made of a metal plate, while an outer shape portion 32h of the male bearing body 32 is fitted on an inner circumferential surface 8a of a coil 8. Then, the lid member 11 is spot-welded at a portion S, thereby completing the motor with a lead screw.

Figure 8B:
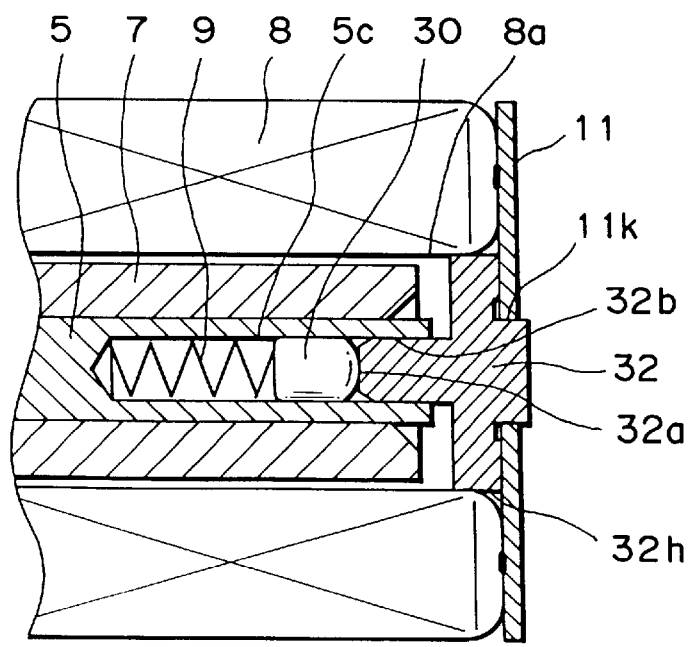
FIG. 8B is a main part sectional view showing another modification of the motor with a lead screw.

FIG. 8B is a main part sectional view showing another modification of the motor with a lead screw having the arrangement shown in FIG. 7. In FIG. 8B, portions identical to those described above are denoted by the same reference numerals to avoid redundant explanation, and the description will be limited to only portions different from their counterparts described above. A ball is formed into the shape of a bullet, as shown in FIG. 8B, and is supported by a male bearing body 32. With this arrangement, the motor with a lead screw can be completed easily, leading to a low cost.

Figure 9A:
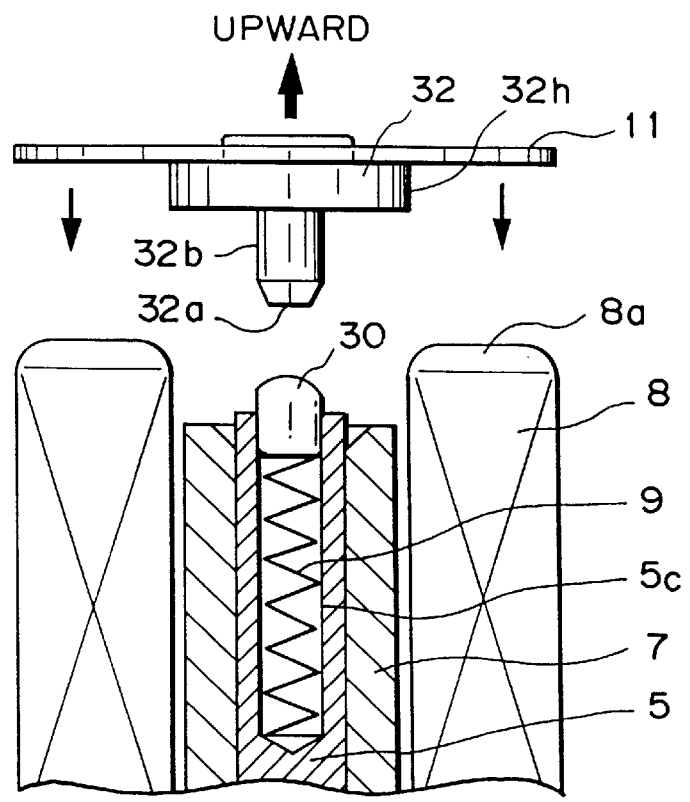
FIG. 9A is a main part sectional view showing a state during assembly of the motor with a lead screw of the third embodiment.

FIG. 9A shows a state during assembly of the arrangement shown in FIG. 8B. A compression coil spring 9 has such a free length that, when a bullet body 30 is inserted in it, the bullet body 30 partly projects from the compression coil spring 9. As a result, a lid member 11 can be moved, from the state shown in FIG. 9A, in a direction of arrows, and be spot-welded, thereby completing the motor with a lead screw. Therefore, when the assembly steps are to be fully automated, automatic assembly with a robot apparatus is possible.

From the above description, according to the arrangements of the above embodiments, a sufficient deformation stroke can be maintained for pre-load biasing the compression coil spring 9 serving as the biasing member, and the length of the motor can be sufficiently decreased (indicated by L in FIG. 4A) in the axial direction. Also, in place of a leaf spring, and since the compressive force of the compression coil spring can be managed easily as compared to that for the leaf spring, this arrangement is particularly suitable for a motor with a lead screw having an outer diameter of, e.g., 10 mm or less.

Figure 9B:
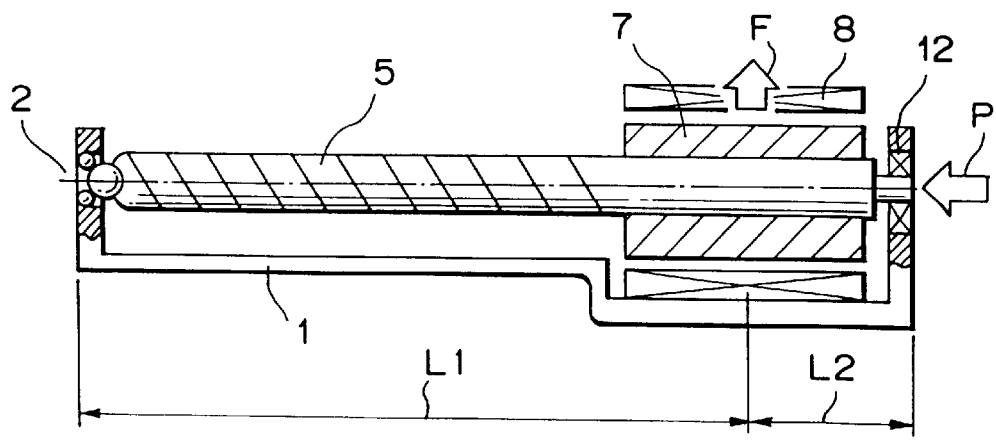
FIG. 9B is a schematic diagram explaining the operation of the motor with a lead screw.
Figure 10A:
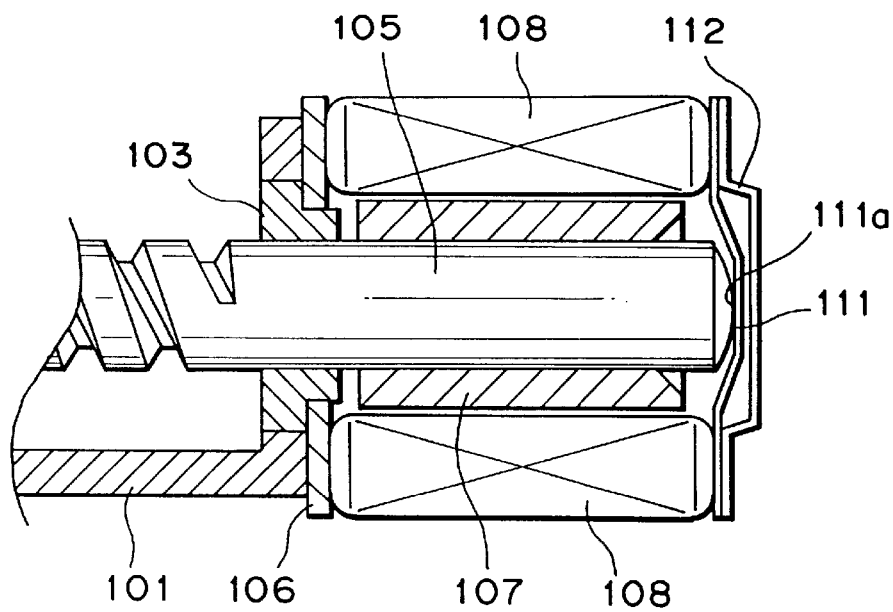
FIG. 10A is a sectional view showing the main part of the conventional motor with a lead screw.
Figure 10B:
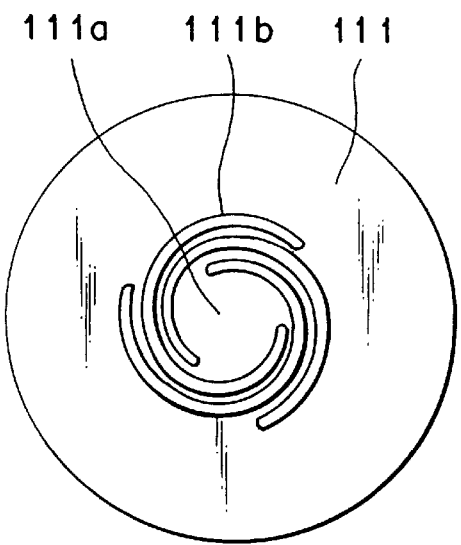
FIG. 10B is a front view of a biasing member 111.
Figure 11:
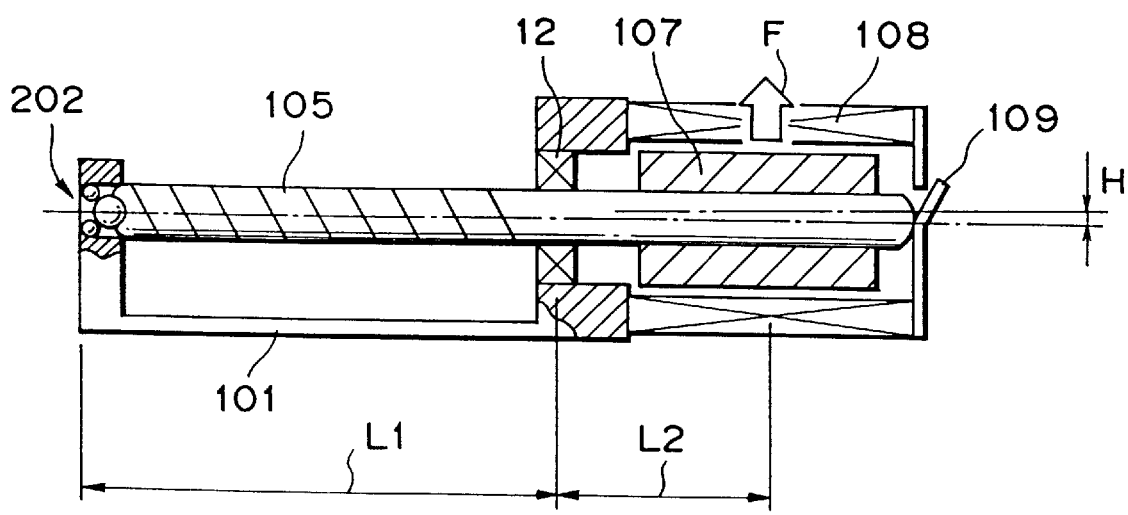
FIG. 11 is a schematic diagram for explaining the operation of the conventional motor with a lead screw.

FIG. 9B is a schematic diagram which applies to the above embodiments in common, in which the distance between the left end of the lead screw 5 and the center of the permanent magnet 7 serving as the rotor is expressed as L1, and the distance between the center of the permanent magnet 7 and the bearing 12 is expressed as L2. In FIG. 9B, the external force in the radial direction which is generated by the pre-load mechanism becomes L1P/(L1+L2). Since the radial load decreases, the durability of the bearing 12 improves.

According to the above embodiment, even if the motor with a lead screw is formed as short as possible in the axial direction of the lead screw, a sufficient stability can be obtained by setting a large amount of deformation for the biasing force of the pre-load mechanism with respect to the lead screw. Therefore, a motor with a lead screw can be provided in which the detent torque is decreased to maintain a high response speed and the service life is increased by preventing an excessive force from acting on the bearing.

As many apparently widely different embodiments of the present invention can be made without departing from the spirit and scope thereof, it is to be understood that the invention is not limited to the specific embodiments thereof except as defined in the appended claims.

What is claimed is:

1. A motor, comprising:
    a base portion,
    an output shaft with integral lead screw wherein backlash is cancelled in an axial direction and wherein said lead screw is formed with a feed screw groove portion, said lead screw having a first end rotationally and axially supported by a first bearing which is supported by said base portion and an intermediate portion rotationally axially supported by a second bearing which is supported by said base portion,
    an annular coil for generating a rotating magnetic field, said annular coil having a first end surface portion fixed to said base portion,
    a permanent magnet located in an inner hole portion of said coil and magnetized to have multiple poles and fixed to said lead screw, and
    pre-load generating means including:
        a blind hole formed concentrically in a second end of said lead screw,
        a coil spring inserted in said blind hole and having a stroke sufficient to generate a biasing force,
        a rod-shaped member, formed with a spherical end face, is inserted in said blind hole abutted to said coil spring to be held and movable in the axial direction in said blind hole by said coil spring with the spherical end face partly projecting from said second end of said lead screw, and
        a substantially flat lid member fixed to a second end surface portion of said annular coil so as to abut against said spherical end face.

2. The motor according to claim 1, wherein a grease-type lubricant is applied to an abutting portion, with said lid member, of said rod-shaped member.

3. The motor according to claim 1, further comprising
    an engaging portion to engage with said feed screw groove portion, a guide portion that allows movement parallel to the axial direction of said lead screw, and a carriage having a recording or reproducing head mounted thereon, so that
    said motor with said lead screw can be used to drive said recording or reproducing head to track a disk-shaped predetermined recording medium.

4. The motor according to claim 1, wherein said rod-shaped member comprises an anti-rotation portion.

5. A motor, comprising:
    a base portion,
    an output shaft with integral lead screw wherein backlash is cancelled in an axial direction and wherein said lead screw is formed with a feed screw groove portion, said lead screw having first and second ends,
    means, supported by said base portion, for rotationally and axially supporting said first end of said lead screw,
    a coil having a first end surface portion fixed to said base portion,
    a permanent magnet located in an inner hole portion of said coil and fixed to said lead screw,
    pre-load generating means including:
        a blind hole formed concentrically in a second end of said lead screw,
        a biasing member inserted in said blind hole and having a stroke sufficient to generate a biasing force,
        a rod-shaped member, formed with a spherical end face, is inserted in said blind hole abutted said biasing member to receive the biasing force, said rod-shape member held to be movable in the axial direction in said blind hole, by the biasing member with the spherical end face partly projecting from said second end of said lead screw, and
        a lid member which abuts against said spherical end face and is fixed to a second end surface portion of said coil, and
        a bearing, supported by said lid member, for rotationally and axially supporting said second end of said lead screw.

6. The motor according to claim 5, wherein said bearing both abuts against said end face of said rod-shaped member and axially supports said rod-shaped member, said bearing being fixed to said lid member, and wherein lubricant is applied between said rod-shaped member and said blind hole.

7. The motor according to claim 5, wherein said bearing is a pivot bearing which both abuts against said end face of said rod-shaped member and axially supports said rod-shaped member.

8. The motor according to claim 5, comprising an engaging portion to engage with said feed screw groove portion, a guide portion that allows movement parallel to the axial direction of said lead screw, and a carriage having a recording or reproducing head mounted thereon, so that said motor with said lead screw can be used to drive said recording or reproducing head to track a disk-shaped predetermined recording medium.

9. A motor, comprising:
    a base portion,
    an output shaft with integral lead screw wherein backlash is cancelled in an axial direction and wherein said lead screw is formed with a feed screw groove portion, said lead screw having first and second ends,
    means, supported by said base portion, for rotationally and axially supporting said first end of said lead screw,
    a coil having a first end surface portion fixed to said base portion,
    a permanent magnet located in an inner hole portion of said coil and fixed to said lead screw,
    pre-load generating means including:
        a blind hole formed concentrically in a second end of said lead screw, a biasing member inserted in said blind hole and having a stroke sufficient to generate a biasing force, a biasing force receiving member, formed with a spherical end face, is inserted in said blind hole abutted said biasing member, said biasing force receiving member held to be movable in the axial direction in said blind hole by the biasing member, and a lid member fixed to the second end surface portion of said coil, and a projecting member being fixed to said lid member and having a portion fitting into said blind hole to support said second end of said lead screw, said blind hole fitting portion of said projecting member abutting against said spherical end face of said biasing force receiving member.

10. The motor according to claim 9, wherein said projecting member is fitted in an inner-diameter portion of said coil.

11. The motor according to claim 9, comprising an engaging portion to engage with said feed screw groove portion, a guide portion that allows movement parallel to the axial direction of said lead screw, and a carriage having a recording or reproducing head mounted thereon, so that said motor with said lead screw can be used to drive said recording or reproducing head to track a disk-shaped predetermined recording medium.

* * * * *

UNITED STATES PATENT AND TRADEMARK OFFICE
CERTIFICATE OF CORRECTION

PATENT NO. : 6,317,287 B1  Page 1 of 1
DATED : November 13, 2001
INVENTOR(S) : Yano et al.

It is certified that error appears in the above-identified patent and that said Letters Patent is hereby corrected as shown below:

<u>Column 13,</u>
Lines 32-33, "rotationally axially" should read -- rotationally and axially --

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,317,287 B1
APPLICATION NO. : 08/629414
DATED : November 13, 2001
INVENTOR(S) : Yano et al.

It is certified that error appears in the above-identified patent and that said Letters Patent is hereby corrected as shown below:

Front page, [75] Inventors: "all of Itabashiku" should read --all of Tokyo--

Front page [73] Assignee: "Copal Company Limited" should read --Nidec Copal Corporation--

Col. 13, lines 32-33, claim 1: "rotationally axially" should read --rotationally and axially--

Signed and Sealed this

Twenty-eighth Day of November, 2006

JON W. DUDAS
*Director of the United States Patent and Trademark Office*